(12) United States Patent
Thaler et al.

(10) Patent No.: US 11,085,379 B2
(45) Date of Patent: Aug. 10, 2021

(54) METHOD FOR COMPENSATING A GAS SPRING EFFECT DURING CYLINDER SHUT-OFF WITH EXHAUST GAS TRAPPING

(71) Applicant: Volkswagen Aktiengesellschaft, Wolfsburg (DE)

(72) Inventors: Tim Thaler, Hannover (DE); Christopher Gessenhardt, Weferlingen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 223 days.

(21) Appl. No.: 16/570,462

(22) Filed: Sep. 13, 2019

(65) Prior Publication Data

US 2020/0088115 A1 Mar. 19, 2020

(30) Foreign Application Priority Data

Sep. 14, 2018 (DE) ...................... 10 2018 215 649.2

(51) Int. Cl.
*F02D 13/06* (2006.01)
*F02P 5/15* (2006.01)
(Continued)

(52) U.S. Cl.
CPC ............. *F02D 13/06* (2013.01); *F02D 17/02* (2013.01); *F02D 37/02* (2013.01);
(Continued)

(58) Field of Classification Search
CPC .......... F02D 13/06; F02D 17/02; F02D 37/02; F02D 41/0087; F02D 2041/0012;
(Continued)

(56) References Cited

U.S. PATENT DOCUMENTS

| 5,562,086 A | 10/1996 | Asada et al. |
| 6,907,871 B2 | 6/2005 | Fukosako et al. |

(Continued)

FOREIGN PATENT DOCUMENTS

| DE | 102004025953 A1 | 12/2004 |
| DE | 102004033231 A1 | 2/2006 |

(Continued)

OTHER PUBLICATIONS

Norm DIN73021 1953-06-00 Bezeichnung der Drehrichtung, der Zylinder and der Zuendleitungen von Kraftfahrzeugmotoren, S. 1 URL: http://perinorm/Perinorm-Volltexte/2016-11_Grunbestand/CD21DE_01/1309191/1309191.pdf.

*Primary Examiner* — Hung Q Nguyen
*Assistant Examiner* — Mark L. Greene
(74) *Attorney, Agent, or Firm* — Muncy, Geissler, Olds & Lowe, P.C.

(57) ABSTRACT

A method for controlling a multi-cylinder combustion engine, wherein the combustion engine has a first operating state in which all cylinders are active, and a second operating state in which one of the multiple cylinders is active and one of the multiple cylinders is deactivated. The method comprises switching the combustion engine from the first to the second operating state, wherein, in the cylinder to be deactivated, an exhaust valve is deactivated after a combustion stroke and an intake valve is deactivated before an intake stroke following the combustion stroke in the closed state, and changing an ignition angle of the cylinder to be deactivated to an earlier ignition time and an optional change of the air/fuel mixture leads to a reduction in a temperature of an exhaust gas arising during the combustion stroke.

16 Claims, 2 Drawing Sheets

(51) Int. Cl.
*F02D 17/02* (2006.01)
*F02D 41/00* (2006.01)
*F02D 37/02* (2006.01)
*F02P 5/04* (2006.01)

(52) U.S. Cl.
CPC .......... *F02D 41/0087* (2013.01); *F02P 5/045* (2013.01); *F02P 5/1512* (2013.01); *F02D 2041/0012* (2013.01); *F02D 2250/21* (2013.01); *Y02T 10/12* (2013.01)

(58) Field of Classification Search
CPC ..... F02D 2250/21; F02P 5/045; F02P 5/1512; Y10T 10/12
See application file for complete search history.

(56) References Cited

U.S. PATENT DOCUMENTS

| | | |
|---|---|---|
| 7,246,594 B2 | 7/2007 | Hartmann |
| 8,887,692 B2 | 11/2014 | Baur et al. |
| 9,970,361 B2 | 5/2018 | Haizaki et al. |
| 10,247,121 B2 | 4/2019 | Shost et al. |
| 2015/0075458 A1 | 3/2015 | Parsels et al. |
| 2016/0215705 A1 | 7/2016 | Haizaki et al. |
| 2017/0342920 A1 | 11/2017 | Pirjaberi et al. |
| 2019/0170074 A1 | 6/2019 | Shost et al. |

FOREIGN PATENT DOCUMENTS

| | | |
|---|---|---|
| DE | 102012002377 A1 | 8/2012 |
| DE | 112015001206 T5 | 12/2016 |
| DE | 102016209957 A1 | 12/2017 |
| WO | WO 2016/031518 A1 | 3/2016 |

METHOD FOR COMPENSATING A GAS SPRING EFFECT DURING CYLINDER SHUT-OFF WITH EXHAUST GAS TRAPPING

This nonprovisional application claims priority under 35 U.S.C. § 119(a) to German Patent Application No. 10 2018 215 649.2, which was filed in Germany on Sep. 14, 2018, and which is herein incorporated by reference.

BACKGROUND OF THE INVENTION

Field of the Invention

The present invention relates to a method for controlling a multi-cylinder combustion engine, wherein the combustion engine has a first operating state in which all cylinders are active, and a second operating state in which one of the multiple cylinders is active and one of the multiple cylinders is deactivated. The engine can therefore be operated in a partial mode. The invention further relates to a corresponding engine controller, a combustion engine, and a vehicle.

Description of the Background Art

To reduce $CO_2$ emissions, individual cylinders in combustion engines can be deactivated/switched off in the partial load range. For this purpose, intake and exhaust valves are closed in the cylinders to be deactivated and fuel injection into the combustion chambers is switched off, whereby the affected cylinders now make no contribution to a torque delivered by a combustion engine. This cylinder shut-off should remain as unnoticed as possible for a driver; i.e., the torque delivered by the combustion engine must remain as constant as possible immediately before, during, and after the cylinder shut-off. In other words, after the cylinder shut-off, the still active/fired cylinders must be operated at a higher load to compensate for the torque/power loss due to the deactivated cylinders. Therefore, the transition from full engine operation to partial engine operation must be given special consideration in the design and layout of a combustion engine.

It is known from DE 10 2012 002 377 A1 (which corresponds to U.S. Pat. No. 8,887,692) to reduce torque fluctuations during a cylinder deactivation and reactivation by adjusting a spark timing for the cylinders. DE 11 2015 001 206 T5 (which corresponds to U.S. Pat. No. 10,247,121) shows that a reduction of unwanted noise, unwanted vibrations, and unwanted harshness (noise, vibration, harshness, in short: NVH) is achievable by means of a cylinder shut-off-engine control. DE 10 2004 025 953 A1 (which corresponds to U.S. Pat. No. 6,907,871) discloses a method for a variable-cylinder combustion engine in order to reduce a shock caused by a fuel cut-off operation of the combustion engine.

During the cylinder shut-off, trapping of a compressible medium in the combustion chamber of a deactivated cylinder is possible by means of a variable sequence in which intake and exhaust valves of the cylinders to be deactivated are shut off. Accordingly, fresh air trapping or exhaust gas trapping can be realized in the combustion chamber. It is also possible to largely evacuate the combustion chamber.

At present, in the course of cylinder shut-off, fresh air trapping is preferred because there are no disadvantages with regard to a torque characteristic, engine load, and oil consumption. In the case of vacuum trapping, a pressure gradient can arise between the combustion chamber and the crankshaft housing, which can cause an increased oil input from the crankshaft housing into the combustion chamber. This in turn can lead to a deterioration of emission levels and an increased tendency for irregular combustion, e.g., knocking and pre-ignition, after the combustion engine is switched back to full operation.

When using exhaust gas trapping in the deactivated cylinder, a positive torque contribution from a last combustion stroke of the cylinder to be deactivated due to subsequent compression of the hot trapped exhaust gas is followed by a deceleration of the piston (in the subsequent exhaust stroke), which can lead to a lowering/collapse of the output torque of the combustion engine. The exhaust gas trapped in the combustion chamber thus acts as a gas spring that acts against the drive in this cycle.

Due to design-related constraints, for example, because of the mechanics of a camshaft used for valve control, it may be necessary to relinquish the advantageous fresh air trapping in favor of exhaust gas trapping.

SUMMARY OF THE INVENTION

It is therefore an object of the present invention to provide a method for controlling a combustion engine, which overcomes at least partially the above-mentioned disadvantages of exhaust gas trapping during a cylinder shut-off.

In an exemplary embodiment a method is provided for controlling a multi-cylinder combustion engine, wherein the combustion engine has a first operating state in which all cylinders are active, and a second operating state in which one of the multiple cylinders is active and one of the multiple cylinders is deactivated, and the method comprises the following steps: switching the combustion engine from the first to the second operating state, wherein, in the cylinder to be deactivated, an exhaust valve is deactivated after a combustion stroke and an intake valve is deactivated before an intake stroke following the combustion stroke in the closed state; and changing an ignition angle of the cylinder to be deactivated to an earlier ignition time in order to reduce a temperature of an exhaust gas resulting during the combustion stroke.

Active cylinders are in particular those in whose combustion chamber thermodynamic cyclic processes (e.g., gasoline, diesel, or other suitable processes) are completely carried out. Such a thermodynamic cyclic process typically comprises an intake stroke, a compression stroke, a combustion stroke, and an exhaust stroke.

Deactivated cylinders are in particular those in whose combustion chamber the thermodynamic cyclic process is not carried out and in particular no combustion stroke is carried out. To this end, supplying of fuel into the combustion chamber of the deactivated cylinder can be stopped and/or fuel ignition and/or actuation of the intake and exhaust valves of the deactivated cylinder can be prevented, thereby keeping the valves closed.

In the second operating state, one of the multiple cylinders can be deactivated, whereas the remainder of the multiple cylinders continue to operate, or in other words are active, and carry along the pistons, coupled via the crankshaft, of the deactivated cylinders.

It can be seen further that at least one of the multiple cylinders can be active and at least one of the multiple cylinders can be deactivated. For example, in a partial engine operation of a 4-cylinder engine, two cylinders can be active and two cylinders deactivated. Furthermore, it is possible that in combustion engines exactly one cylinder is active and exactly one cylinder is deactivated.

The exhaust valve of the cylinder to be deactivated can be deactivated after a combustion stroke and the intake valve of the cylinder to be deactivated is deactivated before an intake stroke following the combustion stroke. This refers to all intake valves and exhaust valves of the cylinder to be deactivated. However, other times for deactivating the intake and exhaust valves are also conceivable, if there is an exhaust gas trapping in the cylinder to be deactivated or deactivated. In other words, when the combustion engine is switched from the first to the second operating state, i.e., when one of the multiple cylinders is deactivated, all intake and exhaust valves of the cylinder to be deactivated are actuated, in particular deactivated or closed, such that exhaust gas trapping occurs in the cylinder to be deactivated or deactivated, in particular in its combustion chamber.

Exhaust gas trapping is a trapping of exhaust gas resulting during the combustion stroke (of the cylinders to be deactivated). The trapped exhaust gas exerts a gas spring effect in the deactivated cylinder.

Further, the intake and exhaust valves are deactivated in a closed state. In general, the intake and exhaust valves are kept closed in any case during a combustion stroke. Deactivation can take place, e.g., by correspondingly actuating the camshafts provided for valve control.

By changing/adjusting the ignition angle of the cylinder to be deactivated in the advance direction (earlier ignition time), a reduction of the temperature of the exhaust gas resulting from the combustion stroke and thus a corresponding reduction in the gas spring effect caused by the exhaust gas can be achieved. Thus a gas spring effect caused by the trapped exhaust gas in the deactivated cylinder can be reduced, because the effect/strength of a gas spring depends on a temperature of the gas forming the gas spring. By the corresponding adjustment of the ignition angle, the temperature of the resulting exhaust gas is reduced, the gas spring effect is reduced, and, consequently, also the resulting drop in torque.

A variant of the method further may include leaning an air/fuel mixture in the cylinder to be deactivated. The leaned air/fuel mixture is to be adjusted/injected into the cylinder to be deactivated to be burnt in a combustion stroke. Leaning means that a combustion air ratio A between an amount of air and an amount of (injected) fuel is greater than 1. Combustion of a leaned air/fuel mixture has the effect that a torque contribution resulting from combustion is smaller than during combustion with a saturated air/fuel mixture ($\lambda=1$). In this case, the torque contribution refers to a torque that can be generated from a combustion stroke of the cylinders and which acts on a crankshaft of the combustion engine.

Due to the reduced torque contribution due to leaning, an increase in the torque contribution which occurs at an earlier ignition time due to the above-described change in the ignition angle can be compensated. In addition, the combustion of the leaned air/fuel mixture results in an exhaust gas whose temperature is lower than that of an exhaust gas from the combustion of a saturated air/fuel mixture. Accordingly, a lower gas spring effect results, because the gas spring effect also decreases with decreasing temperature.

Further, an increase in a torque contribution that can be generated by the active cylinder as a function of a gas spring effect that is caused by the exhaust gas trapped in the deactivated cylinder can occur in the method. As a result, the gas spring effect in the deactivated cylinder can be at least partially compensated by the active cylinder.

There are embodiments in which the generatable torque contribution of the active cylinder can be increased by changing an ignition angle of the active cylinder to an earlier point in time. This results in the effect that only a control/change of the ignition angle provides for an increase in the torque contribution (torque increase) instead of changing/controlling an air/fuel mixture intended for combustion and/or a (fresh) air supply to a combustion chamber of the active cylinder. With the aid of such an ignition angle advance (i.e., changing an ignition angle toward an earlier point in time), a torque increase can be easily realized by the combustion taking place in a combustion stroke.

Further, the earlier ignition time for changing the ignition angle of the cylinder to be deactivated can be adjustable according to a target torque of the combustion engine. Alternatively or in addition thereto, the earlier ignition time for changing the ignition angle of the active cylinder can also be adjusted according to the target torque of the combustion engine. The target torque of the combustion engine can be understood as the torque that the combustion engine is to provide at a certain point in time and that is requested by pressing the gas pedal (driver's request).

Also, the target torque of the internal combustion engine can be determined by the following steps: detecting a target torque of an output shaft of the combustion engine; determining a loss torque resulting from a gas spring effect, wherein the gas spring effect is brought about by the exhaust gas located in the deactivated cylinder; and determining a target torque of the combustion engine as a function of the target torque of the output shaft and the loss torque resulting from the gas spring effect.

In this case, the output shaft can be, for example, a crankshaft. The output shaft target torque can be detected, for example, from a gas pedal position. In other words, the output shaft target torque is the torque that should be available to achieve an operating state (e.g., vehicle speed) that corresponds to the gas pedal position. It should be noted here that a torque generated by the combustion engine, in particular its cylinders, is not fully used to drive the vehicle. As a rule, loss torques occur due to, e.g., component friction and additional consumers (for example, aggregates such as generators and air conditioning compressors), which must be included in the calculation of the target torque. The exhaust gas located in the deactivated cylinder and trapped therein can form a gas spring whose effect can likewise signify a loss torque for the torque generatable by the combustion engine. This loss torque due to the gas spring effect can therefore be included with the output shaft target torque so as to determine a target torque to be generated by the combustion engine. It is also possible to take into account the other above-mentioned loss torques due to component friction and the operation of other consumers (generators, air conditioning compressors) in the determination of the target torque of the combustion engine.

Further, the determination of the loss torque resulting from the gas spring effect can occur during the exhaust gas compression in the deactivated cylinder. Compression of the exhaust gas (or in other words, a gas spring compression) occurs due to a piston movement of the deactivated cylinder to the top dead center, therefore, during a compression stroke or exhaust stroke of the deactivated cylinder with the valves closed. Accordingly, it is conceivable to carry out this process step at multiple, successive points in time in order to represent/detect the compression and/or exhaust stroke, in particular the time period of the compression and/or exhaust stroke.

This process step has the effect that the loss torque arising/determined during the compression of the exhaust gas can be compensated by the torque increase in an active cylinder (e.g., in an adjusted combustion stroke).

The loss torque resulting from the gas spring effect can be determined by means of an empirical model. The loss torque of the gas spring effect, in particular at the time of gas spring compression, can have been determined empirically on an engine test bench. The loss torque determined in this way can then be stored in a characteristic map plotted using an engine load and an engine speed.

The loss torque can also be determined from known boundary conditions and operating state variables using an algorithm or a mathematical model.

In an example, a lower leaning limit for the air/fuel mixture in the cylinder to be deactivated can be determined by means of an empirical model. The lower leaning limit can also be determined empirically on an engine test bench and can be stored in a characteristic map plotted using an engine load and an engine speed. The lower leaning limit is determined so that no engine misfires occur during cylinder shut-off.

Further, increasing the torque contribution generatable by the active cylinder can occur at a time when the gas spring generates a loss torque, in particular at the time of/during the gas spring compression described above. As a result, it is possible to compensate for the gas spring effect, in particular of the loss torque resulting from the gas spring effect, by the torque increase of an active cylinder. It is also possible that this loss torque can also be compensated by the torque increase of multiple active cylinder.

In an example, the change of the ignition angle, in particular the ignition angle advance, for the active cylinder(s) and/or the cylinder(s) to be deactivated can be stored in characteristic maps as an offset to a current ignition angle of the active cylinder(s) and/or cylinder(s) to be deactivated. Offset means a fixed predetermined value or shift by which the ignition angle is adjusted.

Further, the method can comprise the following steps: increasing air charges for all cylinders of the combustion engine before switching the combustion engine from the first to the second operating state; and changing the ignition angles for all cylinders of the combustion engine to a later ignition time before switching the combustion engine from the first to the second operating state.

Accordingly, the supplied (fresh) air amount is increased in all cylinders in advance of the cylinder deactivation, i.e., before the combustion engine is switched from the first to the second operating state. "In advance of the cylinder deactivation" can also mean that the increase in the (fresh) air supply and ignition angle retard in all cylinders occur at least in one duty cycle, if not in multiple duty cycles, prior to cylinder deactivation. In particular, the time of cylinder deactivation is that in which the intake and exhaust valves of the cylinder to be deactivated are deactivated/shut off, e.g., by a corresponding actuation of the camshafts provided for valve control.

The (fresh) air increase in the cylinders can occur, for example, by increasing the delivery ratio of (fresh) air amount in the cylinders. The delivery ratio can be adjusted in particular by controlling the opening times and/or the valve lifts of the intake and/or exhaust valves of the cylinders.

Alternatively or in addition thereto, the (fresh) air increase can occur by increasing the pressure, especially in an intake manifold. For this purpose, the combustion engine can have a compressor disposed/integrated in a (fresh) air/gas line of the combustion engine. In particular, the compressor can be part of an exhaust gas turbocharger which has a turbine which is disposed/integrated in an exhaust gas line of the combustion engine and by which the compressor can be driven. In particular, "intake manifold" means the last section of a (fresh) air/gas line in which the (fresh) air/gas flow is divided into partial flows which are fed to the individual combustion chambers of the combustion engine, wherein the intake manifold has a number of gas supply channels corresponding to the number of combustion chambers.

The increase of the (fresh) air amount in the cylinders has the consequence that a theoretical torque contribution of the individual cylinders increases. In order to prevent an actual increase in the torque as a result of this increase in the air amount, the ignition angle for all cylinders is also adjusted/changed to a later ignition point (or differently stated "in the retard direction"). These steps take place in particular before a cylinder shut-off occurs. These process steps have the effect that by increasing the theoretical torque contribution there is a torque reserve, especially in the cylinder active during the second operating state, with which the gas spring effect, especially the resulting loss torque, can be compensated.

A motor controller for a combustion engine is also provided. The motor controller is configured and designed to carry out the method of the invention and its above-described embodiments and alternatives.

A combustion engine with the above motor controller is also provided. The combustion engine is controllable according to the methods described above.

A vehicle with a combustion engine that has the aforementioned motor controller is also provided.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
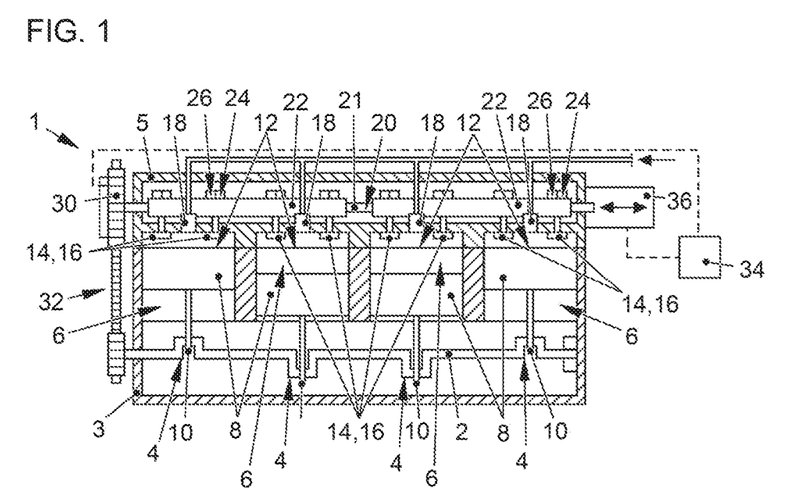
FIG. 1 is a schematic representation of a combustion engine of the invention.

An exemplary embodiment of a combustion engine 1 is shown schematically in FIG. 1, which is operable in particular according to the Otto principle. Combustion engine 1 comprises a crankcase 3 and a cylinder head 5 with four cylinders 6. In the configuration shown, combustion engine 1 is in fact designed as an in-line engine, but other engine configurations, such as V-engines, are also conceivable. There are also engines with fewer or more than four cylinders 6.

A cylinder 6 is described in more detail below as a representative of all four cylinders 6. A combustion chamber 12 is limited by cylinder 6, a piston 8 guided therein, and cylinder head 5. Piston 8 is coupled via a connecting rod 10 to an output shaft, disposed in crankcase 3, in the form of a crankshaft 2, in particular via a crankpin 4 disposed on crankshaft 2.

Cylinder 6, especially combustion chamber 12, is connected in a fluid-conducting manner to an intake manifold via two intake valves 14 and to an exhaust manifold via two exhaust valves 16. In the configuration shown in FIG. 1, exhaust valves 16 are arranged behind intake valves 14 in a viewing direction perpendicular to the plane of the figure. There may also be more or less than two intake and exhaust valves.

In combustion chamber 12 a thermodynamic cyclic process can be carried out in which essentially a fresh gas (air) supplied via intake valves 14 is burned together with a fuel. The fuel can be supplied to combustion chamber 12 via an injection device 18. An exhaust gas resulting from the combustion of the air/fuel mixture is discharged into the exhaust manifold via exhaust valves 16.

Combustion engine 1 can be operated in a 4-stroke process, which is formed of an intake, a compression, a combustion, and an exhaust stroke, which is illustrated below as an example. During the intake stroke, therefore while piston 8 moves from a top dead center (TDC) to a bottom dead center (BDC) of the piston movement, intake valves 14 are opened so that fresh gas flows into combustion chamber 12 via open intake valves 14. In so doing, downward moving piston 8 (therefore, in the direction of crankshaft 2) can draw in the fresh gas. During the intake stroke, exhaust valves 16 can be opened simultaneously with intake valves 14 for a certain period of time, for example, 5° to 20° crankshaft degrees (CD). For the compression stroke following the intake stroke, while piston 8 moves from the BDC to the TDC, intake valves 14 are closed shortly after the BDC, for example, 40° to 60° CD, and exhaust valves 16 continue to be kept closed. Shortly before a TDC or when the TDC is reached, for example, 0° to 40° CD, the combustion stroke starts with an ignition and a gas mixture enclosed in combustion chamber 12 is burned while both intake valves 14 and exhaust valves 16 are kept closed. The combustion stroke continues until shortly before the BDC, for example, 45° to 60° CD, wherein at its end exhaust valves 16 are opened, so that the exhaust stroke begins and piston 8 moves from the BDC to the TDC, and thereby expels the exhaust gas, produced by the combustion, out of combustion chamber 12 via opened exhaust valves 16. The exhaust stroke ends with a closing of exhaust valves 16 shortly after the TDC, for example, 5° to 20° CD. The next intake stroke starts with an opening of the intake valves shortly before the TDC, for example, 10° to 15° CD, so that intake and exhaust valves 14, 16 are opened simultaneously for a short period of time.

The 4-stroke process described above is an example and variations are possible in regard to the ignition time and/or the opening and/or closing time of valves 14, 16 (valve control times).

Intake and exhaust valves 14, 16 for the 4-stroke process described above are actuated by two camshafts 20 disposed in cylinder head 5. Only camshaft 20 for intake valves 14 can be seen in FIG. 1. Camshaft 20 (exhaust camshaft) actuating exhaust valves 16 is disposed behind camshaft 20 (intake camshaft), actuating intake valves 14, in a viewing direction perpendicular to the plane of the figure. Although camshafts 20 are in fact disposed above cylinder 6 in the configuration shown, other camshaft arrangements are also conceivable as alternatives, such as, e.g., camshafts situated below (disposed in crankcase 3). In the configuration shown in FIG. 1, camshafts 20, in particular belt wheels 30 disposed thereon, are driven by crankshaft 2 via a transmission element 32, for example, a chain or a toothed belt.

Camshafts 20 each have two cam carriers 22 which each have four cam pairs formed of first cams 24 and second cams 26. Cams 24, 26 are used to actuate intake and exhaust valves 14, 16. A switching device 36, with which intake and exhaust valves 14, 16 can be switched from actuation by first cams 24 to actuation by second cams 26, can be controlled via a control device 34. The two cam carriers 22 can each be used to operate two adjacent cylinders 6, in particular their intake and exhaust valves 14, 16.

Cam carriers 22 are formed sleeve-shaped and arranged nonrotatably on a basic shaft 21 of camshaft 20. Intake and exhaust camshafts 20 each have a basic shaft 21. The function of the switching device 36 is based on a longitudinal axial displaceability of the sleeve-shaped cam carriers 22. According to a longitudinal axial displacement position of cam carriers 22 as set by switching device 36, cams 24, 26 can alternatively interact with the corresponding intake and exhaust valves 14, 16. Intake and exhaust valves 14, 16 can be activated or deactivated in this way.

An exact embodiment of the switching mechanism and an embodiment of camshaft 20 can be obtained from the document DE 10 2016 209 957 A1.

Combustion engine 1 is operated in a first operating state, in which all cylinders 6 are active, and in a second operating state, in which at least one cylinder 6 is active and at least one cylinder 6 is deactivated. In other words, combustion engine 1 is operable in a full operation and a partial operation. In the configuration shown in FIG. 1, the two central cylinders 6 can be deactivated. Such a cylinder shut-off is accomplished by preventing fuel delivery by injector 18 and actuating intake and exhaust valves 14, 16 by means of the above-described switching of camshaft 20. Intake and exhaust valves 14, 16 are therefore no longer open during the cylinder shut-off.

Figure 2:
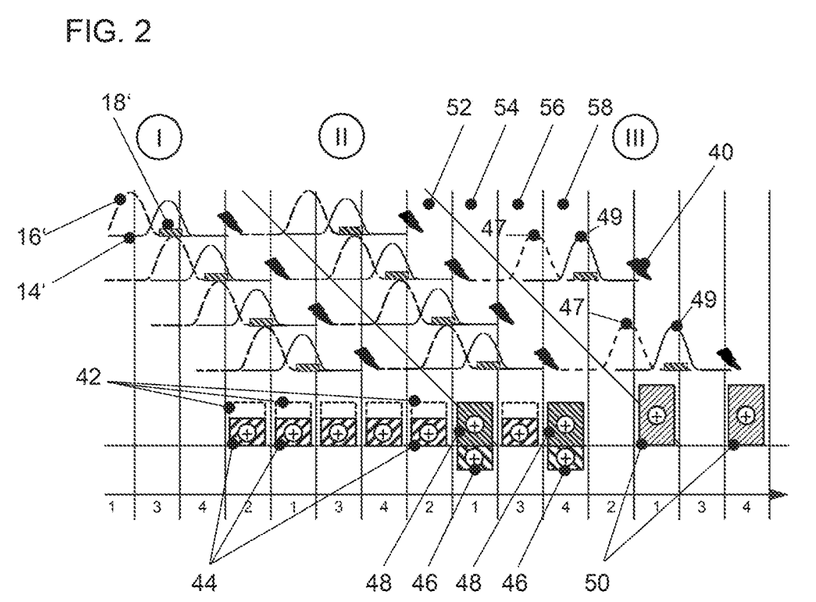
FIG. 2 is a diagram of the torque contributions and the valve control of the cylinders of the combustion engine from FIG. 1.

FIG. 2 shows a diagram in which torque contributions of the four cylinders 6 of combustion engine 1 are shown. The diagram is divided into three regions, wherein these indicate a full engine operation I ("first operating state"), a transition region II to prepare for a half-engine operation, and the half-engine operation III ("second operating state") of combustion engine 1. In FIG. 2, these regions are separated from one another by diagonal lines. A sequence is indicated along a horizontal axis in which sequence the individual cylinders 6 of combustion engine 1 are ignited, therefore, an ignition sequence. Here, the first cylinder 6 is the one that is disposed opposite to a power output side or coupling of combustion engine 1. For other engine/cylinder configurations, reference is made to the current standard DIN 73021 for a cylinder numbering direction. The diagram shown here refers to combustion engine 1 shown in FIG. 1, but it is also to be understood as an example for other combustion engines whose cylinder number, cylinder configuration, and ignition sequence are different from combustion engine 1 shown in FIG. 1.

The diagram shown in FIG. 2 also provides valve curves 14', 16', in particular, valve opening curves, for intake and exhaust valves 14, 16, fuel injection processes 18', and ignitions 40 for the respective cylinders 6. In this case, valve curves 14', 16' are assigned to the cylinders 6 in which ignitions 40 take place to which the corresponding valve curves 14', 16' lead. For example, valve curves 14', 16' shown above lead to an ignition 40 taking place in second cylinder 6, and accordingly valve curves 14', 16' shown above in the diagram represent intake and exhaust valves 14, 16 of second cylinder 6. Both a valve opening duration and a valve lift (amplitude of valve curves 14', 16') can be read from intake valve curves 14' and exhaust valve curves 16'.

In order to enable a torque-neutral, therefore smooth, switching from the full engine operation I to the half-engine operation III, a fresh air charge in all cylinders 6 is increased in preparation for a cylinder shut-off, wherein a higher theoretical torque contribution 42 can be generated by the fresh air increase in cylinder 6. For this reason, an ignition angle is also changed/adjusted in all cylinders 6 to a later ignition time in order to compensate for the increased potential torque contribution 42 and to regulate a torque contribution 44, actually generated by cylinders 6, to an original level that was generated before the fresh air increase in cylinders 6.

In other words, torque contributions 42, 44 result from ignitions 40 and the corresponding resulting burns in combustion chambers 12. Torque contributions 42 shown by dashed lines are theoretically possible contributions, whereas torque contributions 44 are actually achieved. The difference, present in the region of the full engine operation I, between the theoretical and actual torque contribution 42, 44 occurs due to an ignition angle retard; i.e., the ignition, in particular the ignition angle, for starting a combustion stroke is adjusted in the retard direction. As a result, the theoretical torque contribution 42, which is possible due to the gas mixture in combustion chamber 12, in particular an air/fuel mixture, is not optimally utilized. In region I, the theoretically possible torque contribution 42 is not achieved by any cylinder 6, because all cylinders 6 are operated with the ignition angle retard.

In transition region II, it can be seen that a negative torque contribution 46 is superimposed on torque contribution 48 generated by first cylinder 6. The negative torque contribution 46 results from the compression of an exhaust gas which originated from the combustion stroke of second cylinder 6 and has been trapped since then in second cylinder 6.

The occurrence of the exhaust gas trapping in second cylinder 6 will be described below. As can be seen from the diagram shown in FIG. 2, second cylinder 6 is shut off in that exhaust camshaft 20, in particular cam carrier 22 corresponding to the first and second cylinders 6, at a time (or time period) 52 is moved in the longitudinal axial direction by switching device 36 or actuated such that exhaust valves 16 of second cylinder 6 are deactivated. In order to deactivate exhaust valves 16, these are no longer actuated by first cams 24 but by second cams 26 designed as zero cams. By the zero-cam formation, exhaust valves 14 of second cylinder 6 are kept in a closed state regardless of a rotation angle of exhaust camshaft 20. To shut off second cylinder 6, its intake valves 14 are deactivated in addition. This process is analogous to that previously described for exhaust valves 16 at the time (or time period) 54, wherein intake camshaft 20, in particular its cam carrier 22, is switched over. The deactivation of second cylinder 6 by deactivating its exhaust valves 16 after a completed combustion and before the exhaust gas, resulting from the combustion, is expelled from combustion chamber 12, and its intake valves 14 before a subsequent intake results in the aforementioned exhaust gas trapping in second cylinder 6.

It can be seen from FIG. 2 that work delivered by second cylinder 6 to be deactivated, therefore the positive torque contribution 42 at time 52, in a subsequent exhaust stroke of second cylinder 6, is taken up again at least partially by a compression of the exhaust gas trapped in second cylinder 6 at time 54. In other words, the trapped exhaust gas acts as a gas spring the compression of which requires work. The compression occurs because piston 8 of second cylinder 6 to be deactivated or deactivated continues to move/run due to its connection to crankshaft 2 and thus moves back again to the TDC, whereby combustion chamber 12 becomes smaller and the exhaust gas is compressed. However, the compression of the gas spring, because it works against the movement of piston 8 to the TDC, negatively affects a torque of crankshaft 2. In particular, the negative torque contribution 46 of second cylinder 6 resulting from the gas spring compression overlaps with a torque contribution 48 of first cylinder 6, resulting from the combustion, at time 54.

Because at the time of deactivation of second cylinder 6, all cylinders 6 are operated with an ignition angle retard, the negative torque contribution 46 of second cylinder 6 is at least partially compensated because in region I, the theoretical torque contribution was not fully exploited.

For this purpose, in FIG. 2, at a time (or time period) of the gas spring compression, an ignition angle of first cylinder 6 is set in the advance direction, whereby an additional torque contribution is generated, which compensates for the negative torque contribution 46 resulting from the gas spring compression. Thus, a torque contribution 48 generated by first cylinder 6 at least partially compensates for the negative torque contribution 46 of second cylinder 6, in particular the gas spring compression.

The above-described deactivation of second cylinder 6 also applies analogously to third cylinder 6, wherein exhaust valves 16 and intake valves 14 of third cylinder 6 are deactivated at a time (or time period) 56 or 58, respectively. Therefore, a gas spring and a corresponding negative torque contribution, which can be at least partially compensated by an increased torque contribution by fourth cylinder 6, are formed at time 58 in third cylinder 6. The increased torque contribution of fourth cylinder 6 is achievable in the same way as described with reference to first cylinder 6.

The second and third cylinders 6 are shut off in the region of the half-engine operation III. An influence of the gas spring in second and third cylinders 6 is no longer shown but may still be present. The influence of the gas spring decreases with an increasing number of completed working cycles due to blow-by effects (diffusion of (exhaust) gases, trapped in combustion chambers 12, in crankcase 3 via the piston rings of piston 8) and/or due to wall heat losses (release of (exhaust) gas heat to a cylinder wall). Therefore, by way of example, the influence of the gas springs in region III is no longer shown.

Further, it can be seen from FIG. 2 that the remaining active (first and fourth) cylinders 6 are operated such that they each generate an increased torque contribution 50. Torque contributions 50 are greater than the theoretical torque contributions 42 due to an increased fresh air delivery ratio in cylinders 6, which occurs as a result of changed intake valve curves 49. Thus, an amplitude of intake valve curves 49 is greater than that of intake valve curves 14', which represents a larger intake valve lift of intake valves 14 in the half-engine operation III. According to the zero-cam design of second cams 26 for deactivating intake and exhaust valves 14, 16 of second and third cylinders 6, second cams 26, corresponding to first and fourth cylinders 6, are designed such that intake valves 14 and exhaust valves 16 of first and fourth cylinders 6 can be actuated. In particular, intake and exhaust valves 14, 16 are actuated/operated by second cams 26 with changed intake valve curves 49 and exhaust valve curves 47.

Alternatively or in addition to the delivery ratio increase in cylinders 6, the (fresh) air amount in cylinders 6 can also be due to an increase in pressure in the intake manifold of combustion engine 1.

Due to torque contributions 50, the remaining active cylinders 6 generate a similar torque for crankshaft 2 in half-engine operation III as all cylinders 6 generated previously in full-engine operation I. Thus, there is a torque-neutral switching from the first operating state I (full engine operation) to the second operating state III (half-engine operation).

In particular, the torque-neutral switching requires a compensation of the gas spring effect occurring in transition region II, in particular due to the above-mentioned gas spring compression and the associated negative torque contributions 46.

As described above, the negative torque contributions 46 resulting from the gas spring compression can be compensated at least partially, preferably completely, by an ignition angle advance of cylinder 6 to be operated further. In particular, if the level of negative torque contributions 46 is known, their compensation by the ignition angle advance can be carried out particularly well. The gas spring effect is dependent, inter alia, on an amount of fresh gas, in particular the amount of air, present in combustion chamber 12, and a temperature of a gas, in particular the exhaust gas resulting from the combustion and forming the gas spring. The exhaust gas temperature in turn depends on an ignition angle. The gas spring effect can therefore be modeled as a function of the amount of air present in combustion chamber 12 (or the air/fuel mixture) and the ignition angle.

Further, the gas spring effect is not only determinable but can also be influenced. As described above, the gas spring effect depends on the temperature of the exhaust gas forming the gas spring. Because at the time of cylinder deactivation, all cylinders 6 are operated with the ignition angle retard, a lower conversion of thermal energy into mechanical work (torque contribution) takes place, whereby the exhaust gas temperature in the combustion chamber (combustion chamber temperature) is higher compared with an earlier ignition angle. The gas spring effect is accordingly amplified by a torque reserve, i.e., the difference between the theoretically achievable torque contribution 42 and the actually achieved torque contribution 44, which results from the ignition angle retard. Therefore, in order to reduce the exhaust gas temperature, the ignition angle of second and third cylinders 6 to be deactivated or deactivated in transition region II (in the working cycle of cylinder deactivation) can be adjusted in the advance direction. In this case, the ignition angle advance is associated with an increase of the torque contribution, which in turn is due to a leaning of the air/fuel mixture, which is burned in second and third cylinder 6 at time 52 or time 56, respectively. In other words, in the working cycle of the cylinder deactivation, (second and third) cylinders 6 to be deactivated are operated with a leaned air/fuel mixture. The reduction of the exhaust gas temperature and thus of the gas spring effect can therefore be realized by an ignition angle advance and leaning of the mixture in cylinder 6 to be deactivated.

With regard to the leaned air/fuel mixture, it should be noted that a combustion limit of combustion engine 1 must be observed so that no engine misfires occur during cylinder deactivation. Accordingly, the ignition angle advance for cylinder 6 to be deactivated is also to be adjusted as a function of a so-called lean misfire limit of combustion engine 1. In other words, the extent of an ignition angle advance of cylinders 6 to be deactivated is predetermined by the lean misfire limit of combustion engine 1.

Figure 3:
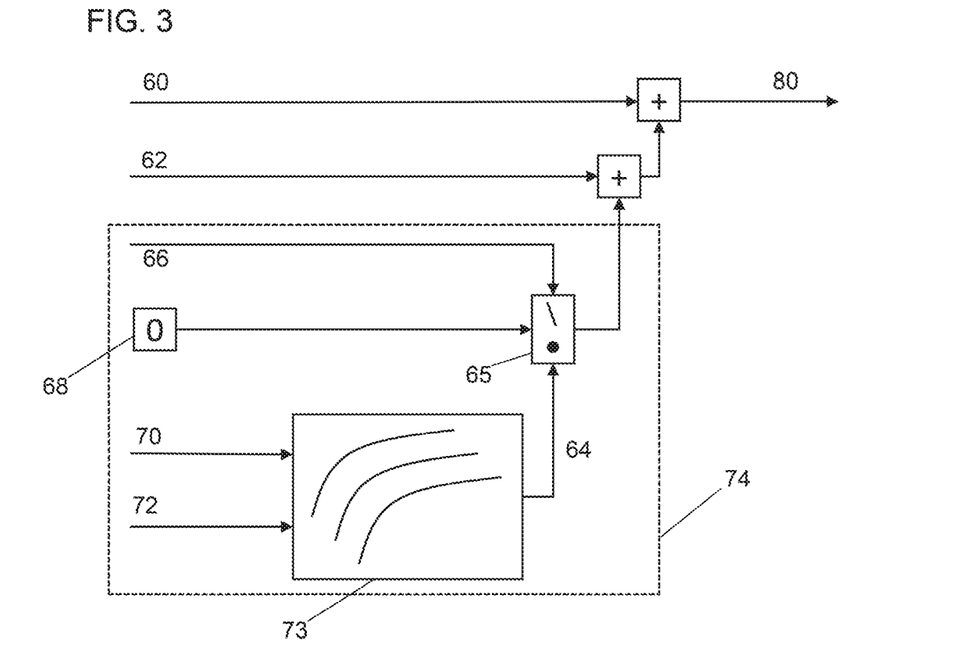
FIG. 3 is a schematic representation of a method for including a loss torque, resulting from a gas spring, in an internal target torque of the combustion engine.

FIG. 3 schematically shows a method for including negative torque contributions 46, resulting from the gas spring effect, in an internal target torque 80 of combustion engine 1. Target torque 80 is the torque that is to be generated by the torque contributions of all cylinders 6. In the ideal case, a target torque 60 of crankshaft 2, which can be detected, e.g., from a gas pedal position, corresponds to internal target torque 80 of combustion engine 1. Under real conditions, however, there are still additional loss torques 62, which can occur, inter alia, due to component friction (for example, between piston 8 and the cylinder wall). It is conceivable, further, that a torque generated by combustion engine 1 is also partially used to operate other vehicle units such as generators or air conditioning compressors, which also represent loss torques 62. Correspondingly, loss torques 62 for achieving a target torque 60 of crankshaft 2 must be included in internal target torque 80 of combustion engine 1. In other words, to determine internal target torque 80, target torque 60 of crankshaft 2 and loss torques 62 are added together (wherein, a value of loss torques 62 is used here).

However, due to the above-described cylinder shut-off of second and third cylinders 6, a loss torque 64, which corresponds to negative torque contribution 46, can still occur due to the gas spring compression, which is likewise to be included in the determination of internal target torque 80. However, this loss torque 64 is only to be included at the time (or time period) of the gas spring compression or during the gas spring compression. Similarly, in the method shown in FIG. 3, a gas spring model 74 is shown which, with the aid of a switching block 65, only includes loss torque 64 when gas spring compression results or during the gas spring compression. In other words, loss torque 64 is only included in internal target torque 80 at the time of the gas spring compression or during the gas spring compression.

In gas spring model 74, arrow 66 represents the time (time period) of the gas spring compression and block 68 all other times at which no gas spring compression takes place. Further, model 74 comprises an empirical model 73 of loss torque 64 due to the gas spring. For this purpose, loss torque 64 is empirically determined on the engine test bench and stored in a characteristic map plotted using an engine load 70 and an engine speed 72.

While block 68 is active, therefore, no gas spring compression takes place, it is passed on to switching block 65 that no loss torque that must be taken into account for determining internal target torque 80 emerges from gas spring model 74. As soon as a gas spring compression occurs, arrow 66 becomes active and passes on to switching block 65 that there is a loss torque 64, so that loss torque 64 emerges from model 74, and it is calculated, in particular summed up, with the other loss torques 62 and the target torque 60 of crankshaft 2 to determine internal target torque 80 of the combustion engine (wherein a value of loss torque 64 is also used here).

Figure 4:
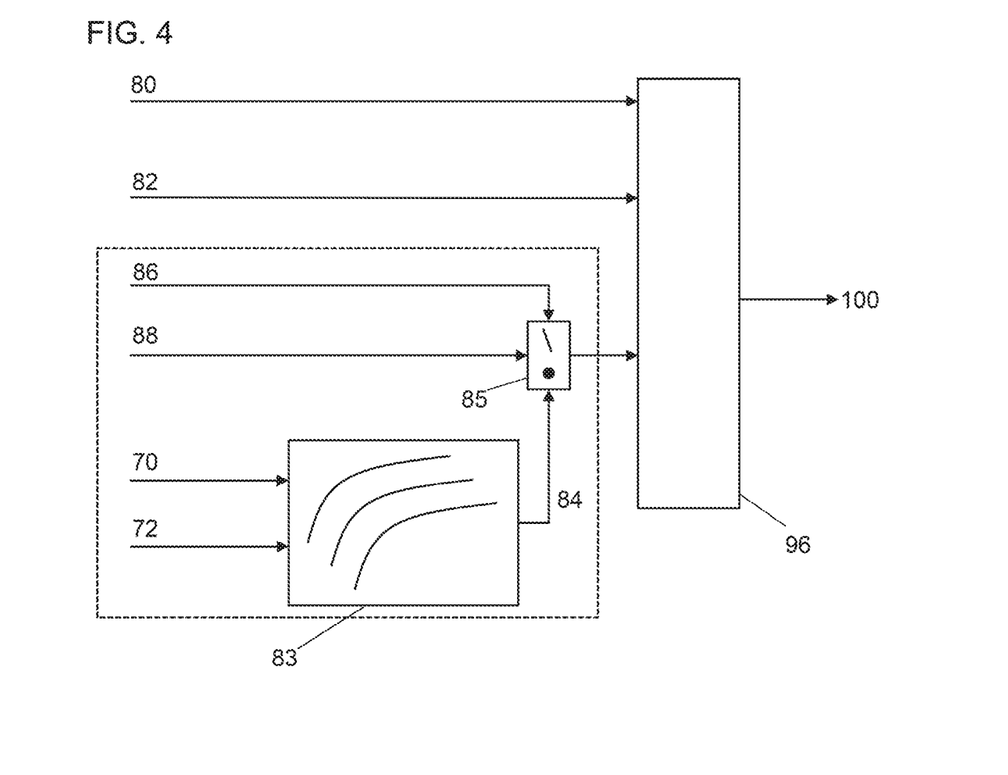
FIG. 4 is a schematic representation of a method for determining an ignition angle for a cylinder of the combustion engine from FIG. 1.

Internal target torque 80 is determined in the method shown schematically in FIG. 4 for determining an ignition angle 100 for one of cylinders 6 of combustion engine 1. A torque model 96 for determining an actual torque of combustion engine 1 is shown in the diagram. The input variables of torque model 96 are the internal target torque 80 of combustion engine 1, an air amount 82 supplied to combustion chamber 12 (of the cylinder 6 under consideration), and an air/fuel mixture 84 emerging from a model 94. The output variable from torque model 96 is then an ignition angle 100 for the cylinder 6 under consideration, which is necessary to achieve the internal target torque 80.

Model 94 works similar to gas spring model 74. In model 94, arrow 86 represents a time of fuel injection into cylinder 6 to be deactivated and arrow 88 an air/fuel mixture from a normal operation of combustion engine 1. Further, model 94 comprises an empirical model 83 for determining the air/fuel mixture 84 having a maximum possible lower leaning limit. The maximum leaned air/fuel mixture is burned in a cylinder 6 to be deactivated in the combustion stroke executed immediately before the cylinder shut-off. For this purpose, the lower leaning limit is empirically determined on the engine test bench and stored in a characteristic map plotted using engine load 70 and engine speed 72.

Further, model 94 comprises a switching block 85. As long as there is no fuel injection into cylinder 6 to be deactivated, in particular at times 52, 58, the air/fuel mixture predetermined by arrow 88 from the normal operation is passed on via switching block 85 to torque model 96. As soon as there is to be a cylinder shut-off, the point in time of the fuel injection represented by arrow 86 is passed on to switching block 85. Similarly, instead of the air/fuel mixture from normal operation represented by arrow 88, the leaned air/fuel mixture 84 determined by empirical model 83 is injected into combustion chamber 12 of cylinder 6 to be deactivated to reduce the gas spring effect.

The leaned air/fuel mixture 84 is passed on to torque model 96. Due to the leaned air/fuel mixture 84, the torque contribution that can be generated by the affected cylinder 6 also decreases. In torque model 96, an efficiency of the leaned air/fuel mixture 84 is calculated, whereby the reduced torque contribution can be calculated. Torque model 96 outputs a corresponding ignition angle 100 to the cylinder 6 under consideration, which compensates for the reduced torque contribution, in particular for achieving internal target torque 80.

The method shown in FIGS. 2 and 3 is applicable to cylinders 6 to be operated further and to be deactivated. It can be seen that a leaning of the air/fuel mixture, which emerges from model 94, is not relevant for cylinders 6 to be operated further or does not take place.

In an alternative to the method shown in FIGS. 2 and 3, the respective ignition angle (adjustments) positions can also be stored as an offset to the currently calculated ignition angle in characteristic maps. The ignition angle (adjustments) positions set as the offset can compensate for loss torque 64 resulting from the gas spring compression, and/or for a reduction of the gas spring effect.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for controlling a multi-cylinder combustion engine that comprises a first operating state in which all of the cylinders are active and a second operating state in which at least one of the multiple cylinders is active and at least one of the multiple cylinders is deactivated, the method comprising:
   switching the combustion engine from the first to the second operating state, wherein, in the cylinder to be deactivated, an exhaust valve is deactivated after a combustion stroke and an intake valve is deactivated before an intake stroke following the deactivation of the exhaust valve; and
   changing an ignition angle of the cylinder to be deactivated to an earlier ignition time in order to reduce a temperature of an exhaust gas resulting during the combustion stroke.

2. The method according to claim 1, further comprising: leaning an air/fuel mixture in the cylinder to be deactivated.

3. The method according to claim 2, wherein a lower leaning limit for the air/fuel mixture in the cylinder to be deactivated is determined via an empirical model.

4. The method according to claim 1, further comprising: increasing a torque contribution that can be generated by the active cylinder as a function of a gas spring effect that is caused by the exhaust gas trapped in the deactivated cylinder.

5. The method according to claim 4, wherein increasing the torque contribution of the active cylinders is accomplished by changing an ignition angle of the active cylinders to an earlier ignition time.

6. The method according to claim 5, wherein the change of the ignition angle for the at least one active cylinder and/or the at least one cylinder to be deactivated is stored in characteristic maps as an offset to a current ignition angle of the at least one active cylinder and/or the at least one cylinder to be deactivated.

7. The method according to claim 1, wherein the earlier ignition time of the cylinder to be deactivated and/or an earlier ignition time for changing the ignition angle of the active cylinder is adjustable according to a target torque of the combustion engine.

8. The method according to claim 7, wherein determining the target torque of the combustion engine comprises:
   detecting a target torque of an output shaft of the combustion engine;
   determining a loss torque resulting from a gas spring effect, wherein the gas spring effect is brought about by the exhaust gas located in the deactivated cylinder; and
   determining a target torque of the combustion engine as a function of the target torque of the output shaft and the loss torque resulting from the gas spring effect.

9. The method according to claim 8, wherein the determination of the loss torque resulting from the gas spring effect occurs during the exhaust gas compression in the deactivated cylinder.

10. The method according to claim 8, wherein the loss torque resulting from the gas spring effect is determined via an empirical model.

11. The method according to claim 8, wherein increasing a torque contribution generatable by the active cylinder occurs at a time when a gas spring generates the loss torque.

12. The method according to claim 1, further comprising:
   increasing air charges for all of the cylinders of the combustion engine before switching the combustion engine from the first to the second operating state; and
   changing the ignition angles for all of the cylinders of the combustion engine to a later ignition time before switching the combustion engine from the first to the second operating state.

13. A motor controller for a combustion engine, the motor controller being configured to carry out the method according to claim 1.

14. A combustion engine with a motor controller according to claim 13.

15. A vehicle comprising a combustion engine according to claim 14.

16. The method according to claim 1, wherein the change of the ignition angle for the at least one cylinder to be deactivated is stored in a characteristic map as an offset to a current ignition angle of the at least one cylinder to be deactivated.

* * * * *